July 10, 1923.
F. G. KRAKAN
AUTOMOBILE SPRING
Filed June 15, 1921
1,461,274
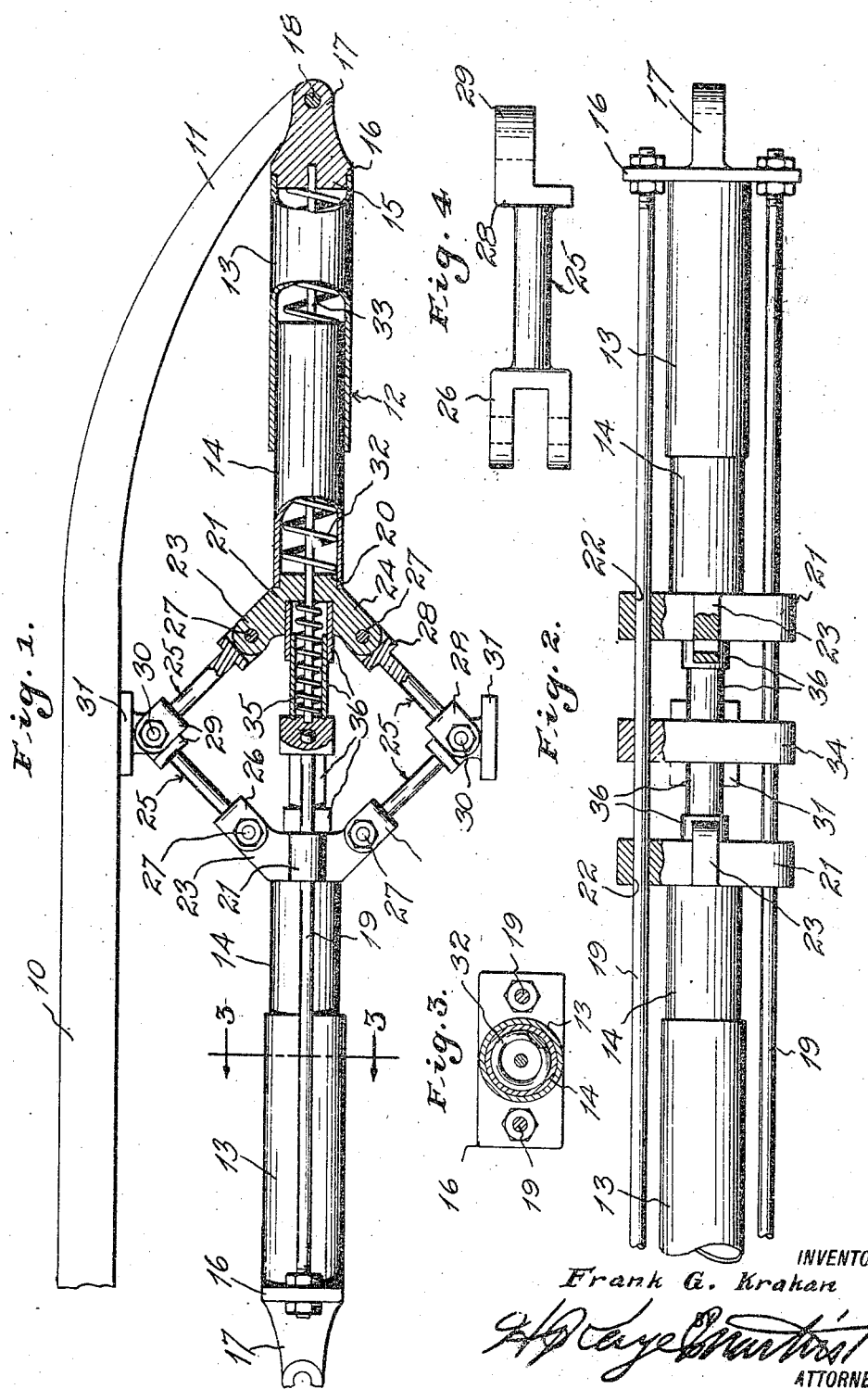
INVENTOR
Frank G. Krakan
ATTORNEY Patented July 10, 1923.

1,461,274

UNITED STATES PATENT OFFICE.

FRANK G. KRAKAN, OF PITTSBURGH, PENNSYLVANIA.

AUTOMOBILE SPRING.

Application filed June 15, 1921. Serial No. 477,617.

*To all whom it may concern:*

Be it known that I, FRANK G. KRAKAN, a citizen of the United States, residing at Pittsburgh, in the county of Allegheny and State of Pennsylvania, have invented new and useful Improvements in Automobile Springs, of which the following is a specification.

This invention relates to improvements in automobile springs and has for its principal object to provide a particularly flexible spring adapted to be placed between the vehicle chassis and axle in such a manner as to provide a resilient yieldable connection which will reduce the shocks transmitted to the chassis to a minimum.

Another object of the invention is to provide a device in which the resilient yielding member constitutes a coiled spring which is housed for the purpose of excluding dust and dirt or other foreign substance.

Still another object of the invention is to provide a device having rebound springs which act in conjunction with the main springs to prevent a too rapid return of the chassis to original position.

Still another object of the invention resides in the provision of a device having longitudinal extending tie rods which provide guides for the movable elements and prevent accidental lateral displacement.

With these and other objects in view the invention consists in the novel construction, combination and arrangement of parts which will be fully set forth in the following specification, claimed and illustrated in the accompanying drawing, in which, Figure 1, is a side view of a portion of the forward end of a chassis showing my improved spring in place, a portion thereof being in section to more clearly illustrate the details of construction, Figure 2, is a top plan view of the spring showing the upper link members removed and illustrating portions in section, Figure 3, is a vertical sectional view taken on line 3—3 of Figure 1, and Figure 4, is a plan view of one of the link members.

Referring to the drawings in detail, the numeral 10 designates the chassis of the vehicle, the forward end of which is downturned as at 11 and is connected to the spring designated generically by the numeral 12.

This spring comprises telescopical sleeve members 13 and 14, the outer ends of which are provided with plugs 15 which are formed on the inner sides of end plates 16.

An ear 17 extends longitudinally from the outer side of each plate 16 which is pierced to receive a bolt 18, by means of which the spring is secured to the chassis. Each plate 16 is provided adjacent its outer ends, with openings to receive the tie rods 19 which act as guides for the cross heads which will be more fully hereinafter described.

Fitted into the inner end of each telescopic member 14 is a plug 20 which is formed integral with a cross head 21, having openings 22 therein for the reception of the guide rod 19. Extending upwardly and downwardly from each cross head intermediate its end, are ears 23 and 24 respectively, to provide connections for the link members which will be more fully hereinafter described.

The link members above referred to are designated generically by the numeral 25 and each comprises a bifurcated head 26 which is pierced to receive bolts 27 by means of which the links are connected with the ears 23 and 24. The opposite end of each link is provided with a head 28, having extending longitudinally therefrom an ear 29 which is pierced to receive a bolt 30, by means of which the adjacent ends of the links are connected to the vertically movable plates 31 which in turn are secured to the chassis and to the axle of the vehicle, as will be clearly understood by reference to Figure 1.

In order to hold the device in proper position and provide the desired resilience, suitable compression coil springs 32 are arranged in the telescopic sleeves 13 and 14 and surround a guide rod 33, the outer end of which is received in the plug 15, while the inner end is secured to a cross member 34 which is rigidly fixed on the guide rods 19 at a point intermediate their ends.

The cross member 34 above referred to, forms the abutment for the inner end of each rebound spring 35 which is contained within telescopic tubular housings 36 which are arranged between the cross heads 21 and the cross member 34, as will be clearly seen from reference to the drawings.

In operation it will be seen that when an obstruction is encountered in the road and the vehicle axle is driven upwardly, the shock will be absorbed by the springs 32, compressing the same and permitting the axle to move toward the chassis. With the return of the axle to normal position under the influence of the springs 32, it will be obvious that rebound shocks will be absorbed by the springs 35 and in this manner riding comfort will be greatly enhanced. Owing to the complete housing of all of the springs, it will be obvious that if so desired they may be packed with lubricant and foreign substances will be excluded, thereby increasing the length of life of the springs and protecting the same from injury.

While in the foregoing there has been shown and described the preferred embodiment of this invention, it is to be understood that certain minor changes, in the details of construction, combination and arrangement of parts may be resorted to without departing from the spirit and scope of the invention as claimed.

What is claimed is:—

1. A vehicle spring comprising guide rods fixed at their ends to a vehicle frame, springs extending longitudinally with relation to the guide rods, and a link mechanism slidable on said guide rods between adjacent ends of the springs, said link mechanism intervening between the frame and the axle of the vehicle.

2. A vehicle spring comprising guide rods fixed at their ends to a vehicle frame, springs extending longitudinally with relation to the guide rods, a link mechanism slidable on said guide rods between adjacent ends of the springs, said link mechanism intervening between the frame and the axle of the vehicle, and rebound springs associated with the link mechanism.

3. A vehicle spring comprising guide rods fixed at their ends to a vehicle frame, springs extending longitudinally with relation to the guide rods, a link mechanism slidable on said guide rods between adjacent ends of the springs, said link mechanism intervening between the frame and the axle of the vehicle, and telescopic housings inclosing said springs.

4. A vehicle spring comprising guide rods fixed at their ends to a vehicle frame, springs extending longitudinally with relation to the guide rods, a link mechanism slidable on said guide rods between adjacent ends of the springs, said link mechanism intervening between frame and the axle of the vehicle and rebound springs associated with the link mechanism, and telescopic housings inclosing said springs.

5. A vehicle spring comprising, spaced parallel guide rods fixed at their ends to a vehicle frame, springs extending longitudinally between the rods, the outer ends of the springs being fixed, a link mechanism slidable on the guide rods and abutting adjacent ends of the springs, the upper and lower ends of the link mechanism being attached to a vehicle chassis and axle respectively, rebound springs associated with the link mechanism, and guide rods extending through the springs.

6. A vehicle spring comprising, spaced parallel guide rods fixed at their ends to a vehicle frame, springs extending longitudinally between the rods, the outer ends of the springs being fixed, a link mechanism slidable on the guide rods and abutting adjacent ends of the springs, the upper and lower ends of the link mechanism being attached to a vehicle chassis and axle respectively, rebound springs associated with the link mechanism, and guide rods extending through the springs, and telescopic housings inclosing said springs.

7. A vehicle spring comprising, a pair of fixed end plates, parallel spaced guide rods holding said plates in spaced relation, compression coiled springs abutting the inner sides of said plates, crossheads slidable on the guide rods and abutting the inner ends of the springs, and a link mechanism connected to the crossheads and disposed between the vehicle chassis and axle and adapted to support the weight of the vehicle.

Signed at Pittsburgh, in the county of Allegheny and State of Pennsylvania, this 10th day of June, 1921.

FRANK G. KRAKAN.